Dec. 8, 1931.  L. A. EDWINSON  1,835,027
AUTOMATIC VALVE
Filed Aug. 25, 1930   2 Sheets-Sheet 1
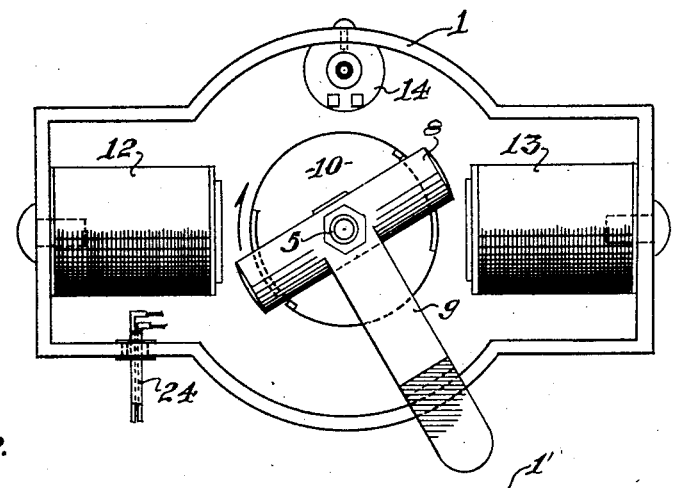
FIG. 2.
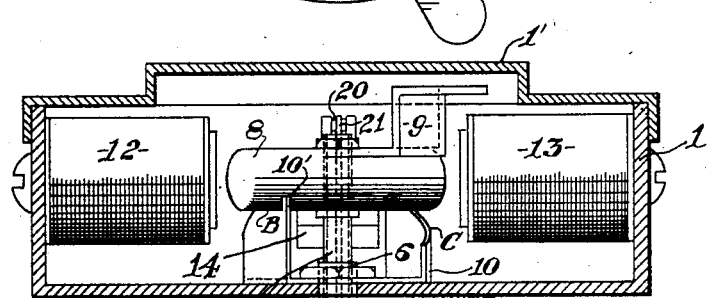
FIG. 1.
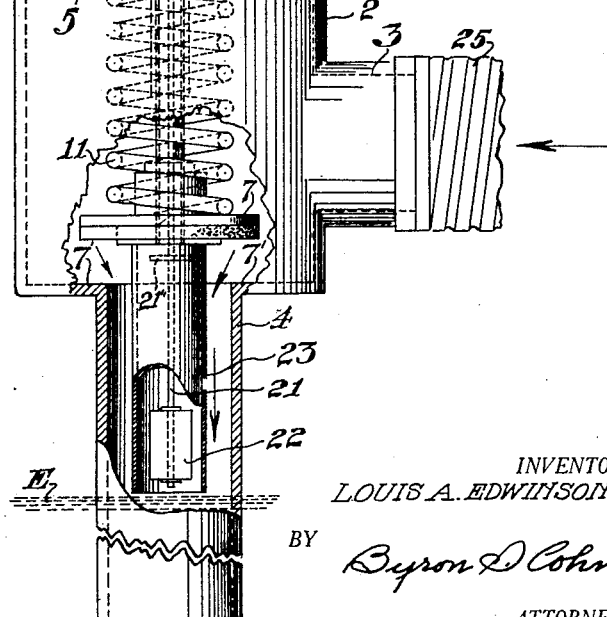
INVENTOR.
LOUIS A. EDWINSON
BY
Byron D. Cohn.
ATTORNEY.

Dec. 8, 1931. L. A. EDWINSON 1,835,027
AUTOMATIC VALVE
Filed Aug. 25, 1930   2 Sheets-Sheet 2

INVENTOR.
LOUIS A. EDWINSON
BY
Byron D. Cohn
ATTORNEY.

Patented Dec. 8, 1931

1,835,027

UNITED STATES PATENT OFFICE

LOUIS A. EDWINSON, OF TOPEKA, KANSAS, ASSIGNOR OF ONE-HALF TO EUGENE A. SNYDER, OF GREAT FALLS, MONTANA

AUTOMATIC VALVE

Application filed August 25, 1930. Serial No. 477,704.

My invention relates to improvements in automatic valves.

The object of my invention is to provide an electrically operated valve that is arranged to close at a certain fluid level.

A still further object of my invention is to provide an electric trip, governed by a float, to close a valve at a certain level of fluid in a container.

A still further object of my invention is to provide a valve of the kind described for use in filling oil drums, the valve having an electric trip arranged to close the valve at a certain fluid level in the drum.

A still further object of my invention is to provide a valve of the kind described having a trip mechanism comprising an armature mounted on the valve stem and rotated to close the valve by means of electromagnets momentarily energized through the action of a float closing a switch.

These and other objects will hereinafter be more fully explained.

Referring to the drawings in which like characters apply to like parts in the different views:

Fig. 1 is an elevation of the valve with parts removed and parts shown in section for the purpose of illustration.

Fig. 2 is a plan view of the valve with the cover and float levers removed.

Figure 5:
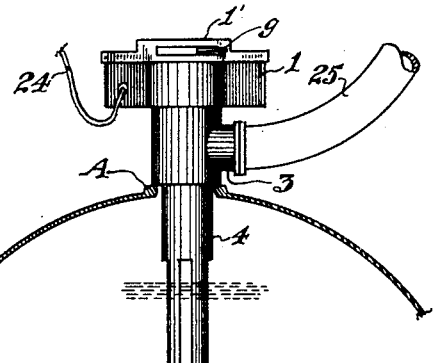
Fig. 5 illustrates the position of the valve with regard to the upper part of an oil drum, the latter shown fragmentary and in section.
Figure 7:
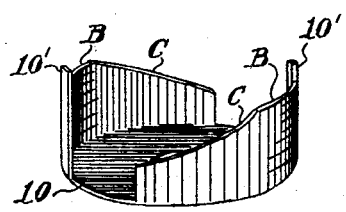
Fig. 7 is an enlarged perspective view of the cam members.

A valve mechanism comprising an upper housing 1 with cover 1', a valve chamber 2, hose connection 3, and spout 4, is arranged for insertion into the opening of an oil drum as at A in Fig. 5.

Figure 3:
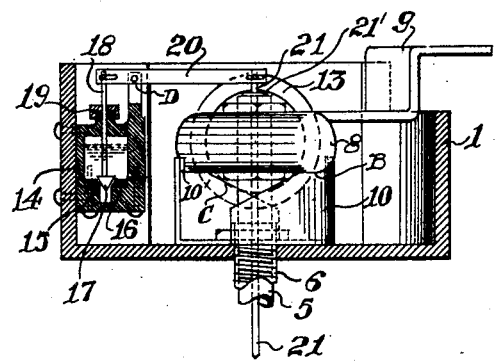
Fig. 3 is a fragmentary section of the upper portion of the valve taken through the center of the switch, the valve being in the open position.
Figure 4:
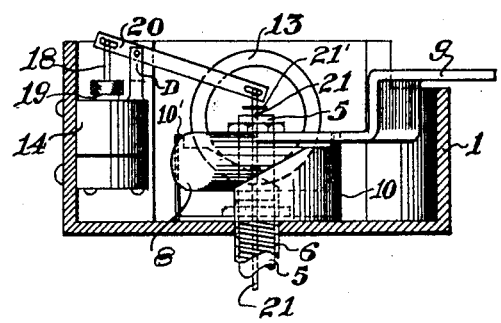
Fig. 4 is a similar view to Fig. 3, the valve being in the closed position.
Figure 6:
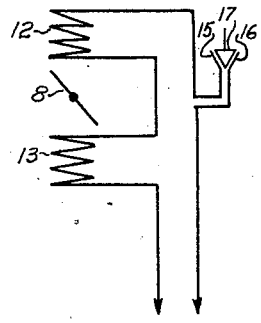
Fig. 6 is a wiring diagram showing the electrical connections of the switch and magnets.

The hollow valve stem 5 passes through the guide 6 from the upper housing 1 into the chamber 2. The valve 7, positioned on the lower end of the said stem, seats at 7' in the valve chamber to close the opening into the nozzle 3. A cylindrical armature 8 having an indicating handle 9 integral therewith, is firmly affixed to the upper etxremity of the valve stem 6. When the armature 8 rests on the cam member 10 at the points B as indicated in Figs. 1, 2 and 3 the valve is held open against the force of the spring 11, which is compressed between the valve and upper part of the chamber 2.

When the armature is rotated slightly in the direction of the arrow in Fig. 2, the force of the spring 11 carries the armature down the inclined parts of the cam 10 as indicated at C until the valve 7 rests on the seat 7' and closes the opening into the nozzle.

As a means to rotate the armature 8 to close the valve after a certain lever of fluid is reached, I have provided in this instance two electromagnets 12 and 13 mounted in the housing 1 as shown. These magnets are energized from a source of electric power by a circuit which is completed by the closing of the switch 14. The switch comprises a closed hollow body having within and under a bath of oil, two contact points 15 and 16 and a V-shaped member 17. The latter is fastened at the end of a rod 18 which is slidably positioned through the packing 19 at the top of the switch body. When the member 18 makes contact with the points 15 and 16 the electromagnets 12 and 13 are energized. When this occurs the armature being initially in the position indicated in Figs. 1, 2 and 3 attempts to align itself with the direction of the magnetic field between the electromagnets and is rotated from the flat portions at B on the cam 10 to the inclined portions at C and is thence forced downward by the spring to the position illustrated in Fig. 3 closing the valve.

In order to obtain this action the switch is closed momentarily by the following means:

A lever 20 is pivotally connected at one end to the rod 18 and trunnioned at an intermediate point on the switch body as at D. At its other end the lever is pivotally connected to the float stem 21 which extends downward through the hollow valve stem 6 to support the float 22. The latter is suspended in the float cylinder 23 which is integral with the valve 7 and extends into the nozzle in the manner shown in Fig. 1. A stop member 21' at the top of the valve stem and 21" below the valve stem on the float stem 21 function to support the float when the valve is in the open position and to open the switch after contact when the valve drops into the closed position.

When the fluid level as at E in Fig. 1 reaches the float buoyancy of the float lifts the float rod to close the switch. This energizes the coils of the electromagnet to rotate the armature to close the valve, which action in turn carries the float stem downward and opens the switch.

The necessary current is conducted into the housing by the cord 24 or any suitable means.

To open the valve after a tripping action the indicating handle 9 is partially rotated in an anti-clockwise direction, with respect to Fig. 2 until the armature 8 is raised by the inclined portions of the cam 10 to finally rest at 3 against the stops 10'.

In operation the valve is connected to a hose 25 which serves the former from a supply of oil. The valve is closed and the nozzle is placed in the bung or opening of an oil drum. The cord is connected to a source of current and the valve is opened. The oil then flows through the hose into the valve chamber and thence into the container. When the oil reaches a certain level in the drum the float is lifted and the valve automatically closes as heretofore described.

This device is very convenient for use where the duties of an attendant demand his attention at numerous filling points and prevents the waste of oil by overflow.

The construction of the switch provides a safe means of making and breaking an electric current near inflammable liquids and as the circuit is energized momentarily the heating of the coils is negligible under proper design.

Such modifications may be used as lie within the scope of the appended claim and what I claim as new and desire to secure by Letters Patent is:

In an automatic fluid valve, a poppet type valve having a hollow stem, an armature comprising a cylindrical bar affixed to the stem, a cam having surfaces to sustain the armature at a certain position, electromagnets connected to a source of current and positioned to rotate the armature, a switch to energize the electromagnets, a float suspended on a stem, said stem extending through the hollow valve stem and connected by levers to the switch.

In testimony whereof I affix my signature.

LOUIS A. EDWINSON.